United States Patent
Miyasaka et al.

(10) Patent No.: US 9,546,104 B2
(45) Date of Patent: Jan. 17, 2017

(54) WHITE GLASS

(71) Applicant: ASAHI GLASS COMPANY, LIMITED, Tokyo (JP)

(72) Inventors: Junko Miyasaka, Tokyo (JP); Seiki Ohara, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/732,975

(22) Filed: Jun. 8, 2015

(65) Prior Publication Data

US 2015/0266770 A1 Sep. 24, 2015

Related U.S. Application Data

(63) Continuation of application No. PCT/JP2013/082819, filed on Dec. 6, 2013.

(30) Foreign Application Priority Data

Dec. 7, 2012 (JP) ................. 2012-268594

(51) Int. Cl.
C03C 3/097 (2006.01)
C03C 4/02 (2006.01)
C03C 3/078 (2006.01)
C03C 21/00 (2006.01)
C03C 4/20 (2006.01)

(52) U.S. Cl.
CPC .............. *C03C 3/097* (2013.01); *C03C 3/078* (2013.01); *C03C 4/02* (2013.01); *C03C 4/20* (2013.01); *C03C 21/002* (2013.01); *C03C 2204/00* (2013.01); *C03C 2204/04* (2013.01); *Y10T 428/131* (2015.01); *Y10T 428/315* (2015.01)

(58) Field of Classification Search
CPC .......... C03C 21/002; C03C 3/097; C03C 4/02; C03C 3/095
USPC ........................................ 428/34.7
See application file for complete search history.

(56) References Cited

U.S. PATENT DOCUMENTS

| | | |
|---|---|---|
| 2009/0068404 A1 | 3/2009 | Akieda et al. |
| 2010/0215862 A1 | 8/2010 | Gomez et al. |
| 2014/0099501 A1 | 4/2014 | Yamamoto et al. |
| 2014/0113141 A1 | 4/2014 | Yamamoto et al. |
| 2015/0111030 A1 | 4/2015 | Miyasaka et al. |
| 2015/0140336 A1 | 5/2015 | Sakagami et al. |

FOREIGN PATENT DOCUMENTS

| | | |
|---|---|---|
| CN | 101244889 A | 8/2008 |
| CN | 102295413 A | 12/2011 |
| JP | 2009-061730 | 3/2009 |

(Continued)

OTHER PUBLICATIONS

International Search Report issued Mar. 18, 2014 in PCT/JP2013/082819 filed Dec. 6, 2013.

(Continued)

*Primary Examiner* — Ellen S Wood
(74) *Attorney, Agent, or Firm* — Oblon, McClelland, Maier & Neustadt, L.L.P.

(57) ABSTRACT

A phase-separated glass for chemical strengthening has a total light reflectance of 10% or more in a wavelength range of 380 nm to 780 nm and a value obtained by dividing a maximum value of the total light reflectance by a minimum value of the total light reflectance of more than 4.2, when measured in a form of a plate having a thickness of 1 mm.

15 Claims, 2 Drawing Sheets

(56) References Cited

FOREIGN PATENT DOCUMENTS

| JP | 2010-255188 | 11/2010 |
|---|---|---|
| JP | 2011-226156 | 11/2011 |
| JP | 2014-28730 | 2/2014 |
| WO | WO 2010/099249 | 9/2010 |
| WO | WO 2012/124757 | 9/2012 |
| WO | WO 2012/124774 | 9/2012 |
| WO | WO 2013/161791 | 10/2013 |
| WO | WO 2014/017495 | 1/2014 |

OTHER PUBLICATIONS

U.S. Appl. No. 14/685,131, filed Apr. 13, 2015, Miyasaka, et al.
U.S. Appl. No. 14/733,393, filed Jun. 8, 2015, Miyasaka, et al.

WHITE GLASS

TECHNICAL FIELD

The present invention relates to a white glass which can be suitably used for a housing of an electronic device, such as a portable and usable communication or information device, or as a building material for buildings or constructions (civil structures).

BACKGROUND ART

Considering various factors, such as decorativeness, scratch resistance, processability and cost, those chosen as appropriate from materials such as resins and metals have been used for housings of electronic devices such as a mobile phone. The housings have been required not only the function of storing electronic components therein but also designabilities for tint of their colors, decoration thereof, and so on.

Of the designabilities, tints in particular are important factors.

In recent years, an attempt to use, as a material for housings, glass which had been not used has been made (Patent Document 1). According to Patent Document 1, the housing body formed from glass can produce effects of giving clarity, unique decoration on an electronic device such as a mobile phone.

Each of electronic devices has a display device such as a liquid crystal panel, on the outer surface thereof. Such a display device tends to become higher in definition and luminance, and with this tendency, backlight as a light source thereof also tends to become higher in luminance. Not only the display device side is radiated with light from the light source, but also there are cases where the light is repeatedly reflected inside the electronic device and reaches to the rear surface of an exterior housing.

Likewise, even in an organic EL (Electro-Luminescence) display requiring no light source, there is a concern about leakage of light from a light-emitting element. Although no problem is presented in the case of using metal as material for a housing, the above-cited case of using glass with clarity arouses a concern that light from a light source may pass through the housing and be recognized from the outside of the device. At the occasion of using glass for the housing, it has therefore been carried out to form a light-shielding means, such as a coating film, on the rear surface of the glass for the purpose of giving the housing the property of shielding from visible rays of light (hereinafter simply referred to as "shielding property").

With luminance enhancement of a light source included in a display device, there arises necessity of having to form a thick coating film or form a film with a plurality of layers on the rear surface (on the device side) of glass in order to form a coating film having a sufficient shielding property, and this necessity becomes a factor behind increases in number of steps and cost.

In addition, when the coating film is not uniformly formed, light passes through only thin portions of the coating film and arouses a concern that visual beauty of the device may be impaired e.g. by shades of the housing being recognized as locally light. For example, in the case of a concave housing, it is necessary to form a uniform film on the entire surface of a concave surface side. However, a step of uniformly forming a coating film having a sufficient shielding property on the concave surface is complicated, and leads to an increase in cost.

At the occasion of obtaining a housing having a white appearance in particular, as mentioned above, it is possible to adopt a method of forming a white coating layer on at least one surface of a transparent glass. However, a white coating material has high transparency, and even though a thick layer thereof is formed, it cannot have a sufficient shielding property.

Accordingly, it is carried out to laminate a black coating layer having a high shielding property to a white coating layer. In this case, it becomes necessary to make the white coating layer thick enough to preclude the black coating layer from being perceived. Thus, the formation of a white-colored housing having a high shielding property through the use of a white coating material has a problem of involving very high cost.

Further, considering fracture by dropping shock during use or contact flaws resulting from long-term use, an electronic device usable as a mobile phone or the like requires its housing to have high strength. In order to enhance resistance of a glass substrate to flaws, glass has so far been chemically strengthened, thereby forming a compressive stress layer in the glass surface.

On the other hand, a gallery or a tunnel is high in temperature and humidity on the inside thereof and air therein is polluted, and hence its wall surface deteriorates fast. In addition, no daylight is shining on the inside of a gallery or a tunnel, and artificial lighting is therefore required during not only nighttime but also daytime. Great amounts of electric power are consumed by lighting of galleries and tunnels scattered throughout the country, and power savings have therefore been hastened.

As a material for the interior part of the gallery or tunnel, tiles with high reflectance have been used traditionally. The use of highly reflective tiles allows reduction in number of lighting fixtures, and it has yielded energy savings. In addition, visibility enhancement has been effected. As to the currently-used interior tiles for tunnels, application of coatings of glaze to their respective ceramic substrates has been carried out for the purpose of enhancing the ability to be cleaned, reflectance or strength.

For example, light-reflecting tiles for interior use of a tunnel have been described in Patent Document 2, wherein the tiles each has had a plurality of particulate asperities formed on a substrate surface thereof and the substrate surface has been coated with glaze for the purpose of increasing the strength thereof. Further in the document, the glaze rendered whitish by incorporation of zirconia into transparent glaze has been mentioned as a white glaze.

Furthermore, highly reflective white tiles to be used as a building material or wall material of buildings have been described in Patent Document 3, wherein there has been a description that contamination control treatment using glaze has been given to the tiles as required.

PRIOR ART DOCUMENTS

Patent Documents

Patent Document 1: JP-A-2009-61730
Patent Document 2: JP-A-2010-255188
Patent Document 3: JP-A-2011-226156

SUMMARY OF THE INVENTION

Problems that the Invention is to Solve

The present inventors have made a proposal to use a phase-separated glass, notably a chemically-strengthened phase-separated glass, as a glass for producing a housing having a white-colored appearance (Japanese Patent Application No. 2012-104059). However, there are various kinds of white colors, ranging e.g. from while color close to pure white to bluish white.

When the designability with bluish white is required, a coloring agent taking on a blue color has been used in the past. However, there has been a problem that, in the case of using the coloring agent, the coloring component remained in a crucible or furnace, and after that, the tint was difficult to be changed.

Therefore, an object of the present invention is to provide a phase-separated glass for chemical strengthening which is excellent in designability and can take on a bluish white without using a coloring agent taking on a bluish tint and has excellent designability.

In addition, in the case of laying tiles in a gallery or a tunnel, even though glaze had been put on the surface of each tile, there has been a concern that scratches and chips made on the tile surface by handling under the execution of construction might cause reduction in ability to be cleaned, reflection capability or strength. In addition, there has been a fear that the glaze might become susceptible to scaling due to difference in thermal expansion between the glaze and the ceramic substrate.

Accordingly, another object of the present invention is to provide a phase-separated glass which can retain its ability to be cleaned, reflection capability and strength even if scratches and chips are made on the glass surface and can therefore be suitably used e.g. as a building material for the interior part of a gallery or tunnel.

Means for Solving the Problems

The present inventor have found that a white glass which takes on a bluish white and has a steady tint can be obtained by adjusting a phase-separated glass to have its total light reflectance within a specific range and increase wavelength dependence of its total light reflectance, and thus, the present invention has been completed.

That is, the following is provided.

1. A phase-separated glass for chemical strengthening, having a total light reflectance of 10% or more in a wavelength range of 380 nm to 780 nm and a value obtained by dividing a maximum value of the total light reflectance by a minimum value of the total light reflectance of more than 4.2, when measured in a form of a plate having a thickness of 1 mm.

2. The phase-separated glass for chemical strengthening according to the above item 1, wherein when reflected light from a D65 light source is measured with respect to the phase-separated glass for chemical strengthening which has been formed into a plate having a thickness of 1 mm and placed on a white standard board having L* value of 98.44, a* value of −0.20 and b* value of 0.23 [EVER-WHITE (Code No. 9582), a product of Evers Corporation], a measured value thereof is positioned within an area enclosed in a quadrilateral specified by A(0.311, 0.319), B(0.299, 0.308), C(0.285, 0.314) and D(0.297, 0.326) in CIE chromaticity coordinates.

3. The phase-separated glass for chemical strengthening according to the above item 1 or 2, wherein a dispersed phase thereof has an average particle size of 0.08 μm or more and less than 0.2 μm.

4. The phase-separated glass for chemical strengthening according to any one of the above items 1 to 3, comprising, in terms of mole percentage, from 50% to 80% of $SiO_2$, from 0 to 7% of $B_2O_3$, from 0 to 10% of $Al_2O_3$, from 0 to 30% of MgO, from 5% to 15% of $Na_2O$, from 0 to 5% of CaO, from 0 to 15% of BaO and from 0 to 10% of $P_2O_5$, wherein a total content of MgO, CaO and BaO is from 10% to 30%.

5. A chemically-strengthened phase-separated glass, which has been obtained by chemically strengthening the phase-separated glass for chemical strengthening according to any one of the above items 1 to 4.

6. A housing, wherein a part or whole of the housing is the chemically-strengthened glass according to the above item 5.

7. The housing according to the above item 6, which is a housing of an electronic device.

8. A phase-separated glass, comprising, in terms of mole percentage, from 50% to 80% of $SiO_2$, from 0 to 7% of $B_2O_3$, from 0 to 10% of $Al_2O_3$, from 0 to 30% of MgO, from 5% to 15% of $Na_2O$, from 0 to 5% of CaO, from 0 to 15% of BaO and from 0 to 10% of $P_2O_5$, wherein a total content of MgO, CaO and BaO is from 10% to 30%, and having a total light reflectance of 10% or more in a wavelength range of 380 nm to 780 nm and a value obtained by dividing a maximum value of the total light reflectance by a minimum value of the total light reflectance of more than 4.2.

9. A phase-separated glass, having a total light reflectance of 10% or more in a wavelength range of 380 nm to 780 nm and a value obtained by dividing a maximum value of the total light reflectance by a minimum value of the total light reflectance of more than 4.2, when measured in a form of a plate having a thickness of 1 mm.

10. The phase-separated glass according to the above item 9, wherein when reflected light from a D65 light source is measured with respect to the phase-separated glass which has been formed into a plate having a thickness of 1 mm and placed on a white standard board having L* value of 98.44, a* value of −0.20 and b* value of 0.23 [EVER-WHITE (Code No. 9582), a product of Evers Corporation], a measured value thereof is positioned within an area enclosed in a quadrilateral specified by A(0.311, 0.319), B(0.299, 0.308), C(0.285, 0.314) and D(0.297, 0.326) in CIE chromaticity coordinates.

11. The phase-separated glass according to the above item 9 or 10, wherein a dispersed phase thereof has an average particle size of 0.08 μm or more and less than 0.2 μm.

12. The phase-separated glass according to any one of the above items 9 to 11, comprising, in terms of mole percentage, from 50% to 80% of $SiO_2$, from 0 to 7% of $B_2O_3$, from 0 to 10% of $Al_2O_3$, from 0 to 30% of MgO, from 5% to 15% of $Na_2O$, from 0 to 5% of CaO, from 0 to 15% of BaO and from 0 to 10% of $P_2O_5$, wherein a total content of MgO, CaO and BaO is from 10% to 30%.

13. The phase-separated glass according to any one of the above items 9 to 12, wherein a total content of $ZrO_2$, $P_2O_5$ and $La_2O_3$ is from 0.5% to 10%.

14. The phase-separated glass according to any one of the above items 9 to 13, which is for use in a building material.

15. The phase-separated glass according to the above item 14, which is for an interior use of a gallery or tunnel.

Advantageous Effects of the Invention

By controlling the value obtained by dividing a maximum value of a total light reflectance by a minimum value of a total light reflectance to more than 4.2, the phase-separated glass for chemical strengthening in the present invention can increase its wavelength dependence of the total light reflectance and can take on a bluish white, and thus, excellent designability can be achieved. Thus, when the phase-separated glass in the present invention is used for housing or the like, the housing can have excellent designability in appearance.

When the glaze layer on the surface of tiles, which have been used for decorating the interior part of a gallery or a tunnel, begins to scale, the ceramic substrate of each tile becomes bare and tends to get contaminated, and the contaminants adhering thereto resist being removed. In contrast to such a situation, by using the phase-separated glass according to the present invention for decorating the interior part of a gallery or a tunnel, even though scratches or chips are made on the glass surface, it becomes possible to defy adhesion of contaminants, to have excellent ability to be cleaned and to maintain reflection performance because the newly exposed surface is glass.

MODE FOR CARRYING OUT THE INVENTION (Total Light Reflectance)

By adjusting tolerances of a perceptual color difference, it is possible to control the tint of white color of glass. More specifically, when measured three stimulus values XYZ are transformed into UCS (Uniform Color Space), it becomes possible to compare small and large of a perceptual color difference in the distance of two color coordinates according to the L*a*b* color specification system, and the color tolerance can be represented as a color difference value $\Delta E^*ab$ determined by the following expression.

$$\Delta E^*ab=[(\Delta L^*)^2+(\Delta a^*)^2+(\Delta b^*)^2]^{1/2}$$

In comparison of separation between colors, so long as the color tolerance is Class-A tolerance, the color difference is generally at a hardly perceived level, or equivalently, the colors are at a level that allows recognition that they are the same. The color difference in Class-A tolerance is 3.2 or less [JIS Z 8721 (1993), JIS L 0809 (2001), and so on].

In the case of assuming that $\Delta L^*$ is constant, the color difference can be adjusted to exceed Class-A tolerance and tint can be taken on by controlling the chroma C (a*, b*) determined from the following expression to more than 3.2.

$$\text{Chroma } C(a^*, b^*)=[(\Delta a^*)^2+(\Delta b^*)^2]^{1/2}$$

Here, the origin point (a*, b*)=(0, 0) is taken as the reference, resulting in $\Delta a^*=a^*-0$ and $\Delta b^*=0$.

Figure 1:
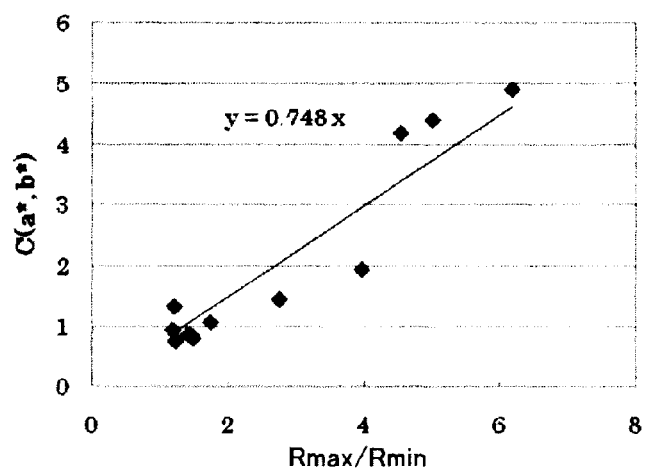
FIG. 1 is a diagram represented as a graph obtained by plotting the value (Rmax/Rmin) obtained by dividing the maximum value of the total light reflectance by the minimum value of the total light reflectance in the wavelength range of 380 to 780 nm as abscissa, and the chroma C (a*, b*) as ordinate.
Figure 2:
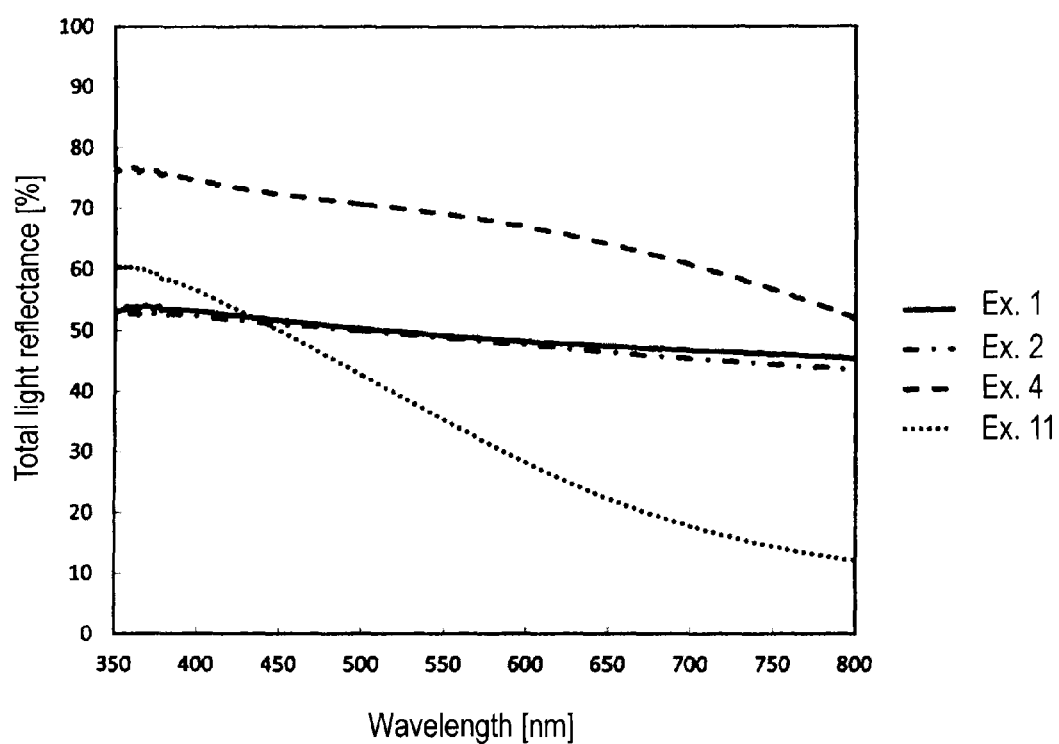
FIG. 2 is a drawing showing total light reflectance curves of Examples 1, 2, 4 and 11.

The present inventors have found that, as shown in FIG. 1, there has been a proportional relationship between the chroma C (a*, b*) and the value obtained by dividing a maximum value of total light reflectance (Rmax) by a minimum value of total light reflectance (Rmin) in the wavelength range of 380 to 780 nm. In addition, as shown in FIG. 2, the present inventors have found that the chroma C (a*, b*) can be increased and tint can be taken on, that is, the glass can have a color different from pure white, by increasing wavelength dependence of total light reflectance.

From the graph shown in FIG. 1, it is found that, in order to adjust the chroma C (a*, b*) to be more than 3.2, the value obtained by dividing the maximum value of total light reflectance (Rmax) by the minimum value of total light reflectance (Rmin) in the wavelength range of 380 to 780 nm is necessary to be controlled to more than 4.2.

Further, for securing sufficient whitening of phase-separated glass, the phase-separated glass for chemical strengthening in the present invention is adjusted to have a total light reflectance of 10% or more in the wavelength range of 380 to 780 nm, when measured in a form of a plate having a thickness of 1 mm. The total light reflectance in the wavelength range of 380 to 780 nm is preferably 12% or more, still preferably 15% or more, still more preferably 20% or more, furthermore preferably 25% or more, still furthermore preferably 35% or more, particularly preferably 40% or more, and extremely preferably 45% or more.

Accordingly, in order that the phase-separated glass for chemical strengthening in the present invention can be colored bluish white, the phase-separated glass should have the total light reflectance of 10% or more in the wavelength range of 380 to 780 mm and the value obtained by dividing the maximum value of total light reflectance by the minimum value of total light reflectance of more than 4.2, when measured in a form of a plate having a thickness of 1 mm, and the value is preferably 4.5 or more, still preferably 5 or more, still more preferably 5.5 or more, particularly preferably 6 or more.

As to the total light reflectance measurements to be measured for a product having a thickness of more than 1 mm, the product is ground from the back until it has a thickness of 1 mm from the surface, followed by subjecting to mirror polishing, and then, the measurements are performed. In the case of a product having a thickness of less than 1 mm, two or more plates of the product are used, and the space between the plates is filled with a dip liquid having the same refractive index as the glass, and then, the measurements are performed.

The measurement of the total light reflectance can be made e.g. with a spectrophotometer. By controlling the average particle size of a dispersed phase of the phase-separated glass to 0.08 μm or more and less than 0.2 μm, the phase-separated glass can be easily adjusted to have, in the wavelength range of 380 to 780 nm, the total light reflectance of 10% or more and a value obtained by dividing a maximum value of the total light reflectance by a minimum value of the total light reflectance of more than 4.2.

(CIE Chromaticity Coordinates)

In the phase-separated glass for chemical strengthening in the present invention, when reflected light from a D65 light source is measured with respect to the phase-separated glass which has been formed into a plate having a thickness of 1 mm and placed on a white standard board having L* value of 98.44, a* value of −0.20 and b* value of 0.23 [EVERWHITE (Code No. 9582), a product of Evers Corporation], a measured value thereof is positioned within an area enclosed in a quadrilateral specified by A(0.311, 0.319), B(0.299, 0.308), C(0.285, 0.314) and D(0.297, 0.326) in CIE chromaticity coordinates, and in such a case, the white glass taking on bluish white can be obtained. The measured value thereof is preferably positioned within an area enclosed in a quadrilateral specified by A(0.310, 0.320), B(0.301, 0.312), C(0.291, 0.316) and D(0.300, 0.325), and the measured value thereof is still preferably positioned within an area enclosed in a quadrilateral specified by A(0.309, 0.320), B(0.302, 0.314), C(0.294, 0.318) and D(0.301, 0.324).

When the reflected light from a D65 light source is measured, by adjusting the measured value to fall within the area enclosed in the quadrilateral specified by A(0.311, 0.319), B(0.299, 0.308), C(0.285, 0.314) and D(0.297, 0.326) in CIE chromaticity coordinates, reflection dependence of the total light reflectance can be increased and the chroma C (a*, b*) can be controlled to a large value of 3.2 or less, thereby taking on a bluish white.

In the case of measuring the reflected light from a D65 light source for a product having a thickness of more than 1 mm, the product is ground from the back until it has a thickness of 1 mm from the surface, followed by subjecting to mirror polishing, and then, the measurement is performed. As to a product having a thickness of less than 1 mm, two or more plates of glass are used, and the space between the plates is filled with a dip liquid having the same refractive index as the glass, and then the measurement is performed.

When the reflected light from a D65 light source is measured, for positioning the measured value in the area enclosed in the quadrilateral specified by A(0.311, 0.319), B(0.299, 0.308), C(0.285, 0.314) and D(0.297, 0.326) in the CIE chromaticity coordinates, it is appropriate that the average particle size of the dispersed phase of the phase-separated glass be adjusted to 0.08 μm or more and less than 0.2 μm.

(Phase-Separated Glass for Chemical Strengthening]

The phase-separated glass for chemical strengthening in the present invention is glass in which phase separation has occurred. The phase separation of glass means that single-phase glass is separated into two or more glass phases. Example of a method for causing phase separation in glass include a method of giving heat treatment to glass after forming the glass and a method of holding glass at a temperature higher than its phase separation temperature before forming the glass.

As to conditions under which heat treatment of glass is carried out for phase separation after forming the glass, the temperature suitable for the heat treatment is typically 50° C. to 400° C. higher than glass transition point. The temperature is preferably 100° C. to 300° C. higher than glass transition point. The time suitable for heat treatment of glass is in a range of 1 to 64 hours, preferably 2 to 32 hours. From the viewpoint of mass productivity, the time for the heat treatment is preferably 24 hours or less, still preferably within 12 hours.

As the method of holding glass at a temperature equal to or more than its phase separation temperature before forming the glass, suitable examples thereof include a method of causing phase separation in glass by holding the glass at a temperature equal to or lower than the phase separation starting temperature, and higher than 1,200° C.

Whether or not the glass is phase-separated can be determined by observation by SEM (scanning electron microscope). In the case of phase-separated glass, separation into two or more phases can be observed by SEM.

Examples of a state of phase-separated glass include a binodal state and a spinodal state. The binodal state is a phase-separated state caused by a nucleation-and-growth mechanism, and the dispersed phase therein is generally spherical in shape. And the spinodal state is a state that separated phases intertwine with each other continuously in three dimensions while having somewhat regularity.

For heightening the surface compressive stress in a chemically-strengthened layer which comes to have surface compressive stress through the ion-exchange treatment of the phase-separated glass for chemical strengthening in the present invention, it is appropriate that the phase-separated glass to be subjected to ion-exchange treatment in the binodal state. And it is preferred that a silica-rich dispersed phase, which also contains other elements, be present in a matrix rich in alkali in particular.

By adjusting the average particle size of the dispersed phase of the phase-separated glass to 0.08 μm or more and less than 0.2 μm, the value obtained by dividing a maximum value of total light reflectance by a minimum value of total light reflectance can be made more than 4.2, and by controlling the chroma C (a*, b*) to a large value of, e.g. more than 3.2, color difference can be made to exceed Class-A tolerance, and the white glass taking on bluish white can be obtained.

The average particle size of the dispersed phase of the phase-separated glass for chemical strengthening can be determined by measuring sizes (diameters) of at least 10 or more particles through SEM observation, and calculating an average of the measured values. The average particle size of a dispersed phase can be determined by observation by SEM. Here, when one phase in the case of a binodal state is made up of spherical particles, the average particle size of the dispersed phase refers to the average diameter of the spherical particles.

In addition, for whitening the phase-separated glass for chemical strengthening in the present invention, it is appropriate that a large difference in refractive index be present between particles of a dispersed phase in the phase-separated glass and a matrix surrounding them.

The volume percentage of particles of the dispersed phase in the phase-separated glass for chemical strengthening in the present invention is desirably 10% or more, preferably 20% or more. Here, the volume percentage of particles of the dispersed phase can be worked out by calculating a proportion of dispersed particles from a photograph of the particles distributed about the glass surface observed under SEM and estimating from the proportion of the dispersed particles.

The phase-separated glass for chemical strengthening in the present invention has no particular restrictions as to the production method thereof. For example, it can be produced by mixing various ingredients in appropriate amounts, melting the resultant mixture by heating up to about 1,500° C. to about 1,800° C., removing bubbles from the molten mixture, homogenizing the resultant mixture through agitation or the like, forming the homogenized mixture into a plate or the like through the use of a well-known float process, down-draw process, press process, roll-out process or the like, or casting the homogenized mixture into a block form, annealing and then machining into an arbitrary shape, further subjecting the machined glass to phase separation treatment, machining the phase-separated glass into a desired shape, and then subjecting to ion-exchange treatment.

By the way, during the step of glass melting, homogenizing, forming, annealing, shape-machining or the like, no particular treatment for phase separation is conducted in the present invention, but the phase-separated glass is construed as also including glass having undergone phase separation through the heat treatment for melting, homogenizing, forming, annealing or shape machining. In this case, the step of subjecting the glass to phase separation treatment is construed as being included in the step of melting the glass or the like.

The phase-separated glass for chemical strengthening in the present invention desirably contains $Na_2O$. When $Na_2O$ is contained in the phase-separated glass, glass strength can be enhanced by ion-exchange treatment performed afterward. For easily forming an intended surface compressive stress layer through the ion-exchange, it is appropriate that the Na$_2$O content in the glass be 5% or more, preferably 7% or more, still preferably 9% or more. For maintaining intended weather resistance, it is appropriate that the Na$_2$O content be controlled to 17% or less, preferably 15% or less, still preferably 13% or less.

For allowing the phase-separated glass for chemical strengthening to have a large DOL, it is appropriate that the CaO content be 5% or less. By controlling the CaO content to 5% or less, ion-exchange becomes less prone to being inhibited. In cases where glass contains CaO, the CaO content expressed by a mass percentage is typically less than 3%. When it is desired to make a DOL value large, the CaO content is preferably made zero or less than 0.5%.

BaO is not essential, but there are cases where it is preferred that the glass contain BaO in a proportion of up to 15% in order to have a high shielding property through whitening and to resist devitrification.

In addition, for giving a high shielding property to the glass through whitening, it is appropriate that the sum of the contents of CaO and BaO be 5% or more, and be 25% or less, preferably 20% or less, still preferably 17% or less.

It is appropriate for the phase-separated glass for chemical strengthening to contain SiO$_2$, Al$_2$O$_3$ and MgO. By containing SiO$_2$, Al$_2$O$_3$ and MgO, the phase-separated glass is apt to undergo ion-exchange and the durability and strength are improved.

The SiO$_2$ content in the phase-separated glass for chemical strengthening is desirably from 50% to 80%, preferably from 52% to 75%, still preferably from 55% to 70%.

The Al$_2$O$_3$ content in the phase-separated glass for chemical strengthening is desirably from 0 to 10%, preferably from 1% to 7%, still preferably from 2% to 5%. The expression of "Al$_2$O$_3$ content is desirably from 0 to 10%" means that Al$_2$O$_3$ may or may not be contained, but when Al$_2$O$_3$ is contained, the content thereof is desirably 10% or less.

The MgO content in the phase-separated glass for chemical strengthening is desirably from 0 to 30%, preferably from 10% to 28%, still preferably from 15% to 25%.

The sum of the contents of MgO, CaO and BaO is desirably from 10% to 30%. When the sum is less than 10%, there is a fear that the phase separation is hardly occured. The sum is preferably 12% or more. When the sum is more than 30%, there is a fear of easily causing devitrification. The sum is preferably 25% or less.

The B$_2$O$_3$ content in the phase-separated glass for chemical strengthening is desirably from 0 to 7%, preferably from 1% to 6%, still preferably from 2% to 5%.

It is appropriate for the phase-separated glass for chemical strengthening to contain at least one selected from ZrO$_2$, P$_2$O$_5$ and La$_2$O$_3$. By containing at least one selected from ZrO$_2$, P$_2$O$_5$ or La$_2$O$_3$ in the phase-separated glass, the tint of white can be intensified in the glass. The sum of the contents of these is desirably from 0.5% to 10%.

The ZrO$_2$ content in the phase-separated glass for chemical strengthening is desirably from 0.5% to 6%, preferably from 1% to 5%. The P$_2$O$_5$ content in the phase-separated glass is desirably from 0 to 10%, preferably from 0.5% to 7%, still preferably from 1% to 6%.

The La$_2$O$_3$ content in the phase-separated glass for chemical strengthening is desirably from 0 to 2%, preferably from 0.2% to 1%.

The phase-separated glass for chemical strengthening may contain K$_2$O. K$_2$O is a component for enhancing melting properties and increasing an ion-exchange rate in chemical strengthening to result in attainment of the desired surface compressive stress and the desired depth of a stress layer. For enhancing the melting properties, K$_2$O contents of less than 1% are insufficient to produce the effect of K$_2$O. The K$_2$O content is desirably 1% or more. In addition, for increasing the ion-exchange rate, the K$_2$O content is desirably 2% or more, typically 3% or more. In addition, for maintaining weather resistance, the K$_2$O content is controlled to 9% or less, preferably 7% or less, typically 6% or less.

(Ion-Exchange Treatment)

Considering that electronic devices usable as mobile phones or the like may undergo fracture by dropping shock during use or may develop contact flaws during long-term use, their housings are required to have high strength. Under the circumstances, in order to enhance the scratch resistance of a glass substrate, it has so far been conducted to form a compressive stress layer in the glass surface by subjecting the glass to chemical strengthening, thereby enhancing the scratch resistance of a glass substrate. By subjecting the phase-separated glass for chemical strengthening in the present invention to ion-exchange treatment, thereby forming a chemically strengthened glass, the chemically-strengthened glass can have a compressive stress layer in the surface, and can gain high strength.

The term "chemical strengthening" refers to the method of forming a compressive stress layer in the glass surface, thereby enhancing glass strength. More specifically, the chemical strengthening is a treatment that, in a surface portion of a glass plate, an alkali metal ion having small ion radius (typically Li ion or Na ion) are exchanged with an alkali ion having larger ion radius (typically Na ion or K ion for Li ion, K ion for Na ion) through the ion-exchange at a temperature equal to or less than glass transition point.

The method for chemical strengthening has no particular restrictions so long as it allows ion-exchange between Li$_2$O or Na$_2$O in a surface layer of glass and Na$_2$O or K$_2$O in a molten salt, respectively. Examples of the method include a method of immersing the glass in e.g. heated molten nitric acid potassium salt (KNO$_3$).

As to conditions for forming a chemically-strengthened layer having a desired surface compressive stress (a surface compressive stress layer) in a glass, though they vary depending on the thickness of the glass, the temperature condition is desirably from 350° C. to 550° C., preferably from 400° C. to 500° C., and the time spent in chemical strengthening is desirably from 1 hour to 144 hours, preferably from 2 hours to 24 hours. Examples of a molten salt include KNO$_3$ and NaNO$_3$. More specifically, it is typical to immerse a glass e.g. in KNO$_3$ molten salt having a temperature of 400° C. to 500° C. over a period of 2 to 24 hours.

When chemically-strengthened glass to be used for housings is produced, sometimes a polishing step is performed in a case where the glass has a plate form. In the step of polishing the glass, the size of abrasive grains used for polishing in the final stage is typically in a range of 2 μm to 6 μm, and it is thought that these abrasive grains eventually form on the glass surface microcracks measuring 5 μm at the greatest in size.

For allowing the effect of enhancing the strength by chemical strengthening to be efficient, it is appropriate that there exist a surface compressive stress layer having a depth greater than the depth of microcracks formed on the glass surface, and the depth of the surface compressive stress layer generated by chemical strengthening is desirably 6 μm or more.

On the other hand, when the depth of the surface compressive stress layer is too deep, the internal tensile stress becomes large to result in a great shock at the time of fracture. In other words, it has been found that, when the internal tensile stress of glass is large, the glass is apt to shatter into fine pieces and scatter at the time of fracture. The experiments have revealed by the present inventors that, as to the glass having a thickness of 2 mm or less, scattering of shattered pieces of the glass became serious when the depth of a surface compressive stress layer is more than 70 µm.

Therefore, the suitable depth of a surface compressive stress layer in the chemically-strengthened glass is 70 µm or less. When the chemically-strengthened glass is used as housings, it is thought that, depending on the kind of electronic devices to be encased in such housings, the depth of a surface compressive stress layer has been made thin for safety in uses e.g. as panels having a high probability of occurrence of contact scratches on the surface. Hence the depth of the surface compressive stress layer is preferably 60 µm or less, still preferably 50 µm or less, typically 40 µm or less.

The depth of the surface compressive stress layer in the chemically-strengthened glass can be measured with EPMA (Electron Probe Micro Analyzer), a surface stress meter (e.g. FSM-6000, manufactured by Orihara Industrial Co., Ltd.) or so on.

When the ion-exchange in ion-exchange treatment is performed e.g. between a sodium component in the surface layer of glass and a potassium component in a molten salt, analysis of potassium ion concentrations in a depth direction of the phase-separated glass is conducted by means of EPMA, and the potassium ion diffusion depth determined by the analysis is regarded as the depth of the surface compressive stress layer.

In addition, when the ion-exchange in ion-exchange treatment is performed e.g. between a lithium component in the surface layer of glass and a sodium component in a molten salt, analysis of sodium ion concentrations in a depth direction of the glass is conducted by means of EPMA, and the sodium ion diffusion depth determined by the analysis is regarded as the depth of the surface compressive stress layer.

Alternatively, it is also possible to introduce surface compressive stress resulting from a thermal expansion difference into a surface portion of chemically-strengthened glass by thinly coating a glass having a thermal expansion coefficient smaller than that of the chemically-strengthened glass or the chemically-strengthened glass. When clear glass is used, the effect of enhancing the beautiful appearance can be obtained through reflections from the front and rear surfaces of the glass.

(Uses)

As uses of chemically-strengthened phase-separated glass obtained by subjecting the phase-separated glass for chemical strengthening in the present invention to ion-exchange treatment (hereinafter referred to as chemically-strengthened glass also in some cases) or the phase-separated glass for chemical strengthening, examples thereof include portable electronic devices, desktop personal computers, large-sized TVs, a building material (e.g. for interior use of the gallery or tunnel), tableware, porous glass, furniture, household electric appliances and the like.

With regard to the phase-separated glass to be used as a building material (hereinafter referred to as the phase-separated glass for a building material in the present invention), typically, it is not subjected to chemical strengthening, but may be chemically strengthened, or may be physically strengthened. By undergoing strengthening, the strength can be further increased.

The term of a portable electronic device as used herein includes, as a concept, a communication device and information device which each can be used in portable form. Examples of such a communication device include communication terminals, such as a mobile phone, PHS (Personal Handy-phone System), a smart phone, PDA (Personal Data Assistance) and PND (Portable Navigation Device, portable car navigation system), and broadcasting receivers, such as a portable radio, a portable television and a one-segment receiver.

Examples of the information device include a digital camera, a video camera, a portable music player, a sound recorder, a portable DVD player, a portable game machine, a notebook computer, a tablet PC, an electronic dictionary, an electronic personal organizer, an electronic book reader, a portable printer and a portable scanner. It should not be construed as being limited to these exemplified ones.

By using the chemically-strengthened glass obtained by subjecting the phase-separated glass for chemical strengthening in the present invention to ion-exchange treatment in such portable electronic devices, the resultant portable electronic devices can have high strength and beautiful appearance.

For example, the chemically-strengthened glass obtained by subjecting the phase-separated glass for chemical strengthening in the present invention to ion-exchange treatment is configured to enclose an electronic device. On one of the outer surfaces of a mobile phone, a display unit including a liquid crystal panel or an organic EL display and an operating unit including buttons, or a combination of display unit and operating unit in one, such as a touch panel, is placed, and the peripheries of such units are enclosed by a casing member. The other of the outer surfaces is made of a panel. A frame member is placed in a space between one outer surface and the other outer surface, which is a thickness portion of the device. These casing member and frame member, or the panel and the frame member may be integrally formed in some cases.

The chemically-strengthened glass obtained by subjecting the phase-separated glass for chemical strengthening in the present invention to ion-exchange treatment can be used for any of the foregoing casing member, panel and frame member. In addition, these members each may have a flat shape, or they each may have a curved shape, and a combination structure of casing member and frame member or a combination structure of panel and frame member may have concave shape or convex shape.

The light source of a display device installed in the interior of an electronic device includes a white-light emission unit, such as a light-emitting diode, organic EL or CCFL. In addition, there is a light source having e.g. an organic EL display which is a device capable of emitting white light or the like without using the light source. When white light leaks outside of the device via a chemically-strengthened glass, it does not look fine. Therefore, it is preferred that the chemically-strengthened glass have the property of ensuring blockage of white light.

In addition, the chemically-strengthened glass has the feature of excellent mechanical strength and the like. The appearance of the phase-separated glass for chemical strengthening in the present invention takes on a white color through the diffusion reflection and scattering of light from particles in the dispersed phase in the glass. White light passing through the chemically-strengthened glass obtained by giving ion-exchange treatment to the phase-separated glass for chemical strengthening in the present invention is scattered owing to light-scattering properties of the glass, and thereby not only the glass is rendered opaque but also white light becomes difficult to perceive on the surface side of the glass.

The chemically-strengthened glass obtained by subjecting the phase-separated glass for chemical strengthening in the present invention to ion-exchange treatment can be desirably used for housings of portable electronic devices, such as mobile phones, and the housings thereof are required to have high strength, light-shielding properties and designability.

The phase-separated glass for chemical strengthening in the present invention has a value obtained by dividing the maximum value of the total light reflectance by the minimum value of the total light reflectance of more than 4.2, and thus, the wavelength dependence of the total light reflectance can be increased and the chroma C (a*, b*) can be controlled to more than 3.2, and thus, the phase-separated glass can take on a bluish white and have excellent designability. Thus, when the phase-separated glass in the present invention is used for housings, the housings can have excellent designability in appearances.

<Glass for Building Material>

The phase-separated glass for a building material in the present invention refers to the phase-separated glass which has a total light reflectance of 10% or more in the wavelength range of 380 to 780 mm and a value obtained by dividing the maximum value of the total light reflectance by the minimum value of the total light reflectance of more than 4.2, when measured in a form of a plate having a thickness of 1 mm.

As to the measurement of the total light reflectance to be made on a product having a thickness of more than 1 mm, the product is ground from the back until it has a thickness of 1 mm from the surface, followed by subjecting to mirror polishing, and then subjected to the measurements. In the case of a product having a thickness of less than 1 mm, two or more plates of glass are used, and a space between the plates is filled with a dip liquid having the same refractive index as the glass, and then, the measurements are made.

Examples of the phase-separated glass for a building material include glass for interior use of gallery or tunnel. The term "gallery" refers to a passage made underground and used mainly for extracting ores from a mine or the like, and the term "tunnel" refers to a structure which is formed naturally or made artificially by civil engineering works so as to lead from the ground to a place of destination by digging through the underground, the seafloor or a mountain and has a space narrow in the axial direction as compared to the height and width of its cross section.

Examples of an artificial tunnel include a passage dug (e.g., a mountain tunnel) through the underground for bringing tap water or laying lifelines such as electric wires (e.g. a communal ditch) and a traffic route such as a road or railroad (track) constructed by digging e.g. through a mountain for the purpose of extracting ores, storing up or transporting supplies, or so on.

Further, for securing sufficient whitening of phase-separated glass, the phase-separated glass for a building material in the present invention is adjusted to have a total light reflectance of 10% or more in the wavelength range of 380 to 780 nm, when measured in a form of a plate having a thickness of 1 mm. The total light reflectance is preferably 15% or more, still preferably 20% or more, still more preferably 25% or more, furthermore preferably 35% or more, particularly preferably 40% or more, and extremely preferably 45% or more.

For the phase-separated glass for a building material in the present invention, for securing sufficiently whitening with bluish white, in the wavelength range of 380 nm to 780 nm, the total light reflectance is controlled to 10% or more and the value obtained by dividing a maximum value of the total light reflectance by a minimum value of the total light reflectance is controlled to more than 4.2, preferably 4.5 or more, still preferably 5 or more, still more preferably 5.5 or more, particularly preferably 6 or more.

The thickness of the phase-separated glass for a building material is desirably 0.5 mm or more, preferably 1 mm or more, still preferably 2 mm or more, particularly preferably 3 mm or more. By allowing the phase-separated glass to have a thickness of 0.5 mm or more, sufficient strength can be attained. Further, from the viewpoint of achieving light weight, the thickness is desirably 30 mm or less, preferably 20 mm or less, still preferably 15 mm or less, extremely preferably 10 mm or less.

When the glaze layer on the surface of tiles each, which have been used for decorating the interior part of a gallery or a tunnel, begins to scale, the ceramic substrate of each tile becomes bare and tends to get contaminated, and the contaminants adhering thereto resist being removed. In contrast to such a situation, by using the white glass according to the present invention for decorating the interior part of a gallery or a tunnel, even though scratches or chips are made on the glass surface, it becomes possible to defy adhesion of contaminants, to have excellent ability to be cleaned and to maintain reflection performance because the newly exposed surface is glass.

In addition, the phase-separated glass for a building material in the present invention is superior in strength as compared with tiles having glazed ceramic substrates, and the surface thereof resists being scratched and chipped, and even though scratches and chips are made on the glass surface, the strength of the glass can be maintained because the newly exposed surface is glass.

Further, according to the phase-separated glass for a building material in the present invention, when such a glass having excellent processability is used as an interior material for galleries or tunnels, it can be an interior material having designability.

The phase-separated glass for a building material in the present invention can be directly attached to on a wall surface with an adhesive or the like. In addition, a glass panel for a building material formed by attaching two or more white glass plates to a cement plate or a metal plate can also be installed on a wall surface. In addition, instead of directly attaching to a wall surface, it may be fastened to a wall surface by means of a jig made of metal or ceramic. In the case of fastening it by means of a jig, the glass may be held at the ends thereof, or it may be fastened by utilizing a hole made in the plane of white glass.

The phase-separated glass for a building material in the present invention may be laminated to a resin or the like or it may be formed into a laminated glass by using a resin or the like for an intermediate layer between glasses for the purpose of preventing the glass from shattering and scattering at the time of a clash between vehicles or the like. In this case, the glass on the back surface may be a white glass or may be a transparent glass.

The phase-separated glass for a building material in the present invention may be subjected to polishing at its edges for the purpose of increasing handleability or preventing strength reduction due to cracking or the like.

As to the size of the phase-separated glass for a building material in the present invention, the length of the short side or short diameter thereof is desirably 30 mm or more, preferably 40 mm or more, still preferably 100 mm or more, particularly preferably 500 mm or more. By having a short side or short diameter of 30 mm or more, the glass pieces to be installed can be prevented from increasing in number, and working efficiency can be enhanced. The length of the long side or long diameter thereof is desirably 3,000 mm or less, preferably 2,000 mm or less, still preferably 1,000 mm or less. By having a long side or long diameter of 3,000 mm or less, it can be easily handled.

The density of the phase-separated glass for a building material in the present invention is desirably 3.0 g/cm$^3$ or less, preferably 2.8 g/cm$^3$ or less. By controlling the density to 3.0 g/cm$^3$ or less, the light weight can be achieved.

It is appropriate that the phase-separated glass for a building material in the present invention include no filler-mixed glass. When a filler-mixed glass is included, the proportion of filler mixed is desirably controlled to 1% or less. Here, the filler refers to ceramic powder or crystalline powder, and the filler-mixed glass refers to a glass made by mixing filler into a glass and thermoforming the resultant mixture. Crystals precipitated out of homogeneous glass obtained through melting are not included in the meaning of the filler.

Examples of such filler include aluminum nitride, zirconium oxide, zircon and titanium oxide. Bubbles are liable to be incorporated into the filler-mixed glass, and there is a fear that the strength may be lowered by stress resulting from a difference in thermal expansion between the filler and the mother glass. By including no filler-mixed glass, strength of the glass can be enhanced.

Acid resistance (0.1 M HCl treatment at 90° C. for 20 hours) of the phase-separated glass for a building material in the present invention is desirably 2 mg/cm$^2$ or less, preferably 1 mg/cm$^2$ or less, still preferably 0.5 mg/cm$^2$ or less. By controlling the acid resistance (0.1 M HCl treatment at 90° C. for 20 hours) to 2 mg/cm$^2$ or less, the resistance to sulfur oxide (SOx) or nitrogen oxide (NOx) included in exhausted gases can be improved.

Alkali resistance (0.1 M NaOH treatment at 90° C. for 20 hours) of the phase-separated glass for a building material in the present invention is desirably 2 mg/cm$^2$ or less, preferably 1 mg/cm$^2$ or less. By controlling the alkali resistance (0.1 M NaOH treatment at 90° C. for 20 hours) to 2 mg/cm$^2$ or less, the resistance to alkali components eluted from concrete or the like used for the surface of a wall can be improved.

The phase-separated glass for a building material in the present invention desirably has a bending strength of 60 MPa or more, preferably 80 MPa or more. When its bending strength is 60 MPa or more, the phase-separated glass can have strength enough to resist a clash between cars or deformation caused in a wall surface with the lapse of time. The bending strength is determined by three-point bending test.

The phase-separated glass for a building material in the present invention is typically in the shape of a plate. In addition to a flat plate, the glass may be shaped into a curved plate. In this case, the glass shaped into a flat plate, a block or the like is brought into a softened state by reheating, and may be deformed by its own weight or by press forming. Alternatively, the glass may be formed into a desired shape by the so-called direct press method, wherein press forming is carried out by casting molten glass directly into a press mold.

The surface of the phase-separated glass for a building material in the present invention may be flat surface, or may be unevenly patterned. The uneven pattern may be formed by sandwiching the glass in a softened state between rollers the surface of which is in an uneven state or by pressing. Further, the glass surface may be mirror surface, or it may be glassy by grinding with abrasive powder or by etching.

For the purpose of improving devitrifying properties, the CaO content in the phase-separated glass for a building material is desirably controlled to 5% or less, preferably 4% or less. By controlling the CaO content to 5% or less, devitrification becomes hard to occur. In cases where glass contains CaO, the CaO content expressed as a mass percentage is typically lower than 5%.

Although BaO is not essential in the phase-separated glass for a building material in the present invention, there are cases where it is preferred that BaO be present in a proportion of up to 15% in order to have a high shielding property through whitening. When the BaO content is more than 15%, there is a fear that a tendency for the glass to cause devitrification may be increased.

In addition, for giving a high shielding property to the glass through whitening, it is appropriate that the sum of the contents of CaO and BaO be 5% or more, and 25% or less, preferably 20% or less, still preferably 17% or less.

It is appropriate for the phase-separated glass for a building material to contain $SiO_2$, $Al_2O_3$ and MgO. By containing $SiO_2$, $Al_2O_3$ and MgO, the phase-separated glass is apt to undergo ion-exchange and is improved in durability and strength.

The $SiO_2$ content in the phase-separated glass for a building material is desirably from 50% to 80%, preferably from 52% to 75%, still preferably from 55% to 70%.

The $Al_2O_3$ content in the phase-separated glass for a building material is desirably from 0 to 10%, preferably from 1% to 7%, still preferably from 2% to 5%. Here, the expression e.g. of "$Al_2O_3$ content is desirably from 0 to 10%" means that $Al_2O_3$ may or may not be contained, but when $Al_2O_3$ is contained, the content thereof is desirably 10% or less.

The MgO content in the phase-separated glass for a building material is desirably from 0 to 30%, preferably from 10% to 28%, still preferably from 15% to 25%.

The sum of the contents of MgO, CaO and BaO is desirably from 10% to 30%. When the sum is less than 10%, there is a fear that phase separation is hardly occurred. The sum is preferably 12% or more. When the sum is more than 30%, there is a fear of easily causing devitrification. The sum is preferably 25% or less.

The $B_2O_3$ content in the phase-separated glass for a building material is desirably from 0 to 7%, preferably from 1% to 6%, still preferably from 2% to 5%.

It is appropriate that the phase-separated glass for a building material contain at least one selected from $ZrO_2$, $P_2O_5$ and $La_2O_3$. By containing at least one selected from $ZrO_2$, $P_2O_5$ and $La_2O_3$ in the phase-separated glass, the tint of white can be intensified in the glass. The sum of these contents is desirably from 0.5% to 10%.

The $ZrO_2$ content in the phase-separated glass for a building material is desirably from 0.5% to 6%, preferably from 1% to 5%. The $P_2O_5$ content in the phase-separated glass is desirably from 0 to 10%, preferably from 0.5% to 7%, still preferably from 1% to 6%.

The $La_2O_3$ content in the phase-separated glass for a building material is desirably from 0 to 2%, preferably from 0.2% to 1%.

The phase-separated glass for a building material may contain $K_2O$. $K_2O$ is a component for enhancing melting properties. For producing the effect of enhancing melting properties, $K_2O$ contents of less than 1% are insufficient. The $K_2O$ content is desirably 1% or more. On the other hand, the $K_2O$ contents of more than 9% cause reduction in weather resistance. Accordingly, the $K_2O$ content is desirably 7% or less, typically 6% or less.

The $Na_2O$ content in the phase-separated glass for a building material is desirably from 3% to 15%, preferably 5% or more, still preferably 8% or more, particularly preferably 9% or more. And it is preferably 14% or less, still preferably 13% or less. $Na_2O$ has the effect of enhancing the melting properties of glass, and it is preferred to adjust the $Na_2O$ content to be 5% or more because it can bring about sufficient effect. In addition, the $Na_2O$ content is desirably controlled to 15% or less because such control can prevent occurrence of reduction in not only weather resistance but also whiteness of the glass.

The glass in the present invention essentially consists of the components recited above, but it may further contain other components so long as the objects of the present invention are not impaired thereby. In such a case, the total content of such components is desirably 9% or less. The total content of 10 components which are $SiO_2$, $B_2O_3$, $Al_2O_3$, MgO, CaO, SrO, BaO, $ZrO_2$, $Na_2O$ and $P_2O_5$, is desirably 90% or more, typically 94% or more.

Examples of components other than those recited above include the following ones.

$La_2O_3$ and $Nb_2O_5$ each have the effect of enhancing whiteness of the glass and may contain in a proportion of 5% or less. By controlling the proportion to 5% or less, the glass can be prevented from becoming brittle. The contents thereof each are preferably 3% or less, still preferably 2% or less.

Although the desirable composition range of the phase-separated glass for a building material is exemplified above, even compositions other than the foregoing ones are included in the scope of the present invention so long as they suit the spirit of the objects of the present invention.

EXAMPLE

The present invention will now be illustrated concretely with reference to the following examples, but the present invention should not be construed as being limited to these examples.
(Production of Glass)

Example 1

A 15 g batch prepared according to the composition presented in Table 1 was put in a platinum crucible, and melted for 20 minutes at 1,600° C. After the temperature of the furnace was reduced to 1,390° C., the batch was held for 68 minutes at a temperature equal to less than its phase separation starting temperature, and then it was taken out of the furnace and left standing for cooling. The phase separation starting temperature of the glass thus obtained was 1,500° C. Thereafter, the glass was kept at 670° C. for one hour, then annealed to room temperature at a rate of 1° C./min, followed by subjecting to polishing. Thus, a plate glass was obtained. The dispersed phase of the thus obtained plate glass was an alkali-rich phase.

The obtained glass contained $SO_3$ because Glauber's salt was added to the batch for the purpose of clarification. The amount of Glauber's salt added was adjusted so that 100 parts by weight of the glass, exclusive of $SO_3$, contained $SO_3$ in a proportion corresponding to 0.4 parts by weight. The same adjustment was made in the following Examples.

Example 2

A 15 g batch prepared according to the composition presented in Table 1 was put in a platinum crucible, and melted for 20 minutes at 1,600° C. After the temperature of the furnace was reduced to 1,420° C., the batch was held for 67 minutes at a temperature equal to less than its phase separation starting temperature, and then it was taken out of the furnace and left standing for cooling. The phase separation starting temperature of the glass thus obtained was 1,500° C. Thereafter, the glass was kept at 670° C. for one hour, then annealed to room temperature at a rate of 1° C./min, followed by subjecting to polishing. Thus a plate glass was obtained. The dispersed phase of the thus obtained plate glass was an alkali-rich phase.

Example 3

A 15 g batch prepared according to the compoisition presented in Table 1 was put in a platinum crucible, and melted for 20 minutes at 1,600° C. After the temperature of the furnace was reduced to 1,390° C., the batch was held for 68 minutes at a temperature equal to or less than its phase separation starting temperature, and then it was taken out of the furnace and left standing for cooling. The phase separation starting temperature of the glass thus obtained was 1,500° C. Thereafter, the glass was kept at 670° C. for one hour, then annealed to room temperature at a rate of 1° C./min, followed by subjecting to polishing. Thus, a plate glass was obtained. The dispersed phase of the thus obtained plate glass was an alkali-rich phase.

Examples 4 to 13

A 400 g batch each prepared according to the composition presented in Table 1 was put in a platinum crucible, melted for 4 hours at the melting temperature presented in Table 1, followed by casting into a mold and left standing for cooling, thereby performing molding. Thereafter, heat treatment was performed according to each condition of post-molding heat treatment for phase separation as presented in Table 1, followed by polishing, thereby obtaining the plate glasses in Examples 4 to 13, respectively.
(Ion-Exchange Treatment)

Next, the samples prepared in Examples 1 to 3 and 5 to 10 were chemically strengthened by performing ion-exchange treatment in which the samples were immersed in 450° C. 100% $KNO_3$ molten salt for 6 hours. The samples prepared in Examples 4 and 13 were chemically strengthened by ion-exchange treatment in which the samples were immersed in 500° C. 100% $KNO_3$ molten salt for 19 hours. Further, the samples prepared in Examples 11 and 12 were chemically strengthened by ion-exchange treatment in which the samples were immersed in 450° C. 100% $KNO_3$ molten salt for 92 hours.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Composition (mol %) | $SiO_2$ | 60.7 | 60.7 | 59.7 | 71.2 | 61.5 | 61.5 | 61.5 | 56.8 | 56.8 | 56.8 | 72.0 | 72.0 | 71.2 |
|  | $Al_2O_3$ | 3.4 | 3.4 | 5.0 | 0.0 | 3.4 | 3.4 | 3.4 | 5.0 | 5.0 | 5.0 | 0.0 | 0.0 | 0.0 |
|  | $B_2O_3$ | 3.9 | 3.9 | 3.9 | 0.0 | 0.0 | 0.0 | 0.0 | 3.9 | 3.9 | 3.9 | 0.0 | 0.0 | 0.0 |
|  | MgO | 15.2 | 15.2 | 14.9 | 22.8 | 15.4 | 15.4 | 15.4 | 14.9 | 14.9 | 14.9 | 23.0 | 23.0 | 22.8 |
|  | $ZrO_2$ | 2.5 | 2.5 | 2.5 | 0.0 | 4.3 | 4.3 | 4.3 | 2.5 | 2.5 | 2.5 | 0.0 | 0.0 | 0.0 |
|  | $Na_2O$ | 9.3 | 9.3 | 9.1 | 5.0 | 10.3 | 10.3 | 10.3 | 11.1 | 11.1 | 11.1 | 5.0 | 5.0 | 5.0 |
|  | $P_2O_5$ | 5.1 | 5.1 | 5.0 | 1.0 | 5.1 | 5.1 | 5.1 | 5.9 | 5.9 | 5.9 | 0.0 | 0.0 | 1.0 |
|  | total | 100.0 | 100.0 | 100.0 | 100.0 | 100.0 | 100.0 | 100.0 | 100.0 | 100.0 | 100.0 | 100.0 | 100.0 | 100.0 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Producing conditions | Melting temperature [° C.] | 1,600 | 1,600 | 1,600 | 1,650 | 1,650 | 1,650 | 1,650 | 1,650 | 1,650 | 1,650 | 1,650 | 1,650 | 1,650 |
|  | Taking-out temperature [° C.] | 1,390 | 1,420 | 1,390 | 1,650 | 1,650 | 1,650 | 1,650 | 1,650 | 1,650 | 1,650 | 1,650 | 1,650 | 1,650 |
|  | Pre-molding phase separation process time [min] | 68.4 | 67.2 | 68.4 | 0 | 0 | 0 | 0 | 0 | 0 | 0 | 0 | 0 | 0 |
|  | Post-molding heat treatment for phase separation | None | None | None | 900° C. 4 hours | None | 900° C. 4 hours | 950° C. 4 hours | None | 900° C. 4 hours | 950° C. 4 hours | 900° C. 4 hours | 850° C. 4 hours | 850° C. 4 hours |

(Evaluation Method)

The glasses obtained in Examples 1 to 13 were assessed according to the following evaluation method. Even after each phase-separated glass was chemically strengthened, the amount of change caused in its total light reflectance was at most 0.1% or less.

(1) Total Light Reflectance

The measurement of the total light reflectance was performed in a wavelength range of 380 nm to 780 nm by using a 1 mm-thick glass having mirror-finished top and bottom surfaces and a spectrophotometer (Lamda 950, a product of PerkinElmer Inc.), and from a maximum value of the total light reflectance (Rmax) and a minimum value of the total light reflectance (Rmin) determined by the measurement, the value obtained by dividing the maximum value by the minimum value, i.e. Rmax/Rmin, was calculated.

(2) Chroma

Chromaticity (a*, b*) indicating hue and chroma was measured with a chroma meter (CR-400, a color and color-difference meter, a product of Konica Minolta, Inc.) in accordance with the L*a*b* color system standardized by CIE (Commission Internationale de l'Eclairage) and specified by JIS (JIS Z 8729) in Japan, on the conditions that D65 was used as a light source and a 1 mm-thick glass was put on a standard white board of L*=98.44, a*=−0.20 and b*=0.23 (EVER-WHITE (Code No. 9582), a product of EVERS CORPORATION). From the values a* and b* thus obtained, the chroma C was calculated according to the following equation.

Chroma $C(a^*, b^*) = [(\Delta a^*)^2 + (\Delta b^*)^2]^{1/2}$ (3) CIE Chromaticity Coordinates Values x and y in the XYZ color system of CIE (Commission Internationale de l'Eclairage) were determined with a chroma meter using D65 as a light source. Results obtained are shown in Table 2.

(4) Surface Compressive Stress Value (CS) and Depth of Compressive Stress Layer (DOL)

Values of surface compressive stress (CS, unit: MPa) and depth of compressive stress layer (DOL, unit: μm) were measured with a surface stress meter (FSM-6000, a product of Orihara Industrial Co. Ltd.).

(5) Phase-Separated Structure

The phase-separated structure of a plate glass was observed by SEM. In a case where one phase in separation separated phase was observed as spherical shape, it was considered to be bimodal, while in a case where separated phases were observed intertwine with each other, it was considered to be spinodal.

(6) Average Particle Size

The average particle size of the dispersed phase of a plate glass was determined from the observation by SEM.

(7) Volume Density of Particles

The volume density of particles in the dispersed phase was determined by calculating density of dispersed particles from a photograph of the particles distributed in the glass surface observed by SEM and estimating from the density of the dispersed particles.

Figure 3:
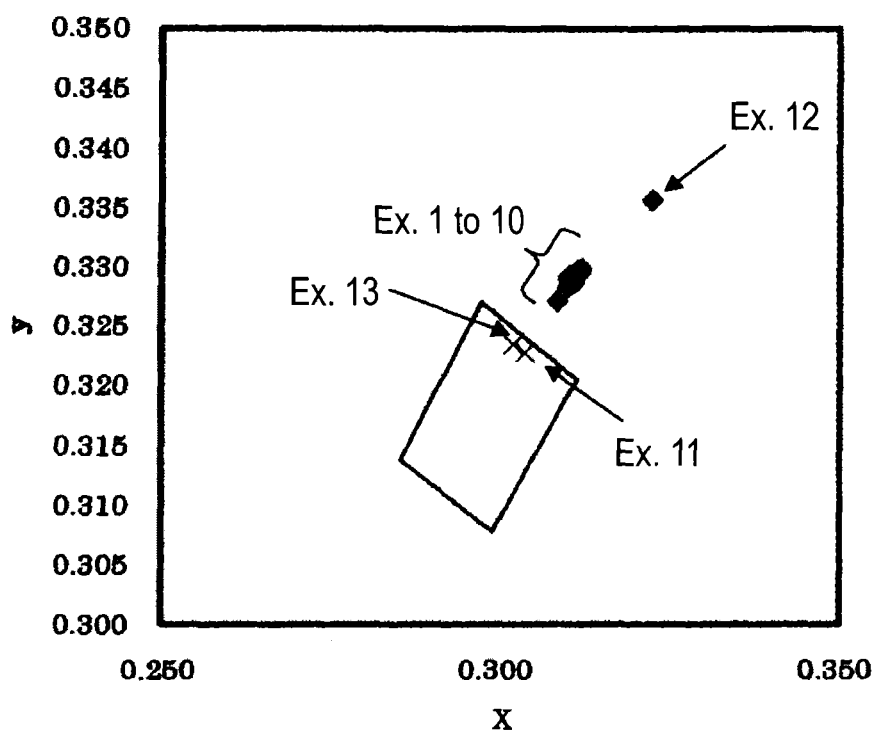
FIG. 3 is a diagram showing results obtained by plotting x values and y values as abscissa and as ordinate of CIE chromaticity coordinates, respectively.

Results obtained are shown in Table 2 and FIGS. 1 to 3. Examples 11 and 13 are working examples of the present invention, and Examples 1 to 10 and 12 are comparative examples.

FIG. 1 shows a graph obtained by plotting as abscissa the value (Rmax/Rmin) obtained by dividing the maximum value of the total light reflectance by the minimum value of the total light reflectance in the wavelength range of 380 to 780 nm and plotting as ordinate the chroma C (a*, b*). FIG. 2 shows the total light reflectance curves of Examples 1, 2, 4 and 11.

TABLE 2

|  |  | Ex. 1 | Ex. 2 | Ex. 3 | Ex. 4 | Ex. 5 | Ex. 6 | Ex. 7 | Ex.8 | Ex. 9 | Ex. 10 | Ex. 11 | Ex. 12 | Ex. 13 |
|---|---|---|---|---|---|---|---|---|---|---|---|---|---|---|
| Total light reflectance (wavelength: 380 to 780 nm) | Rmax | 53.6 | 52.7 | 71.4 | 75.7 | 47.2 | 46.5 | 46.8 | 63.2 | 63.1 | 63.1 | 58.6 | 42.8 | 79.7 |
|  | Rmin | 45.6 | 43.8 | 58.4 | 53.9 | 11.9 | 17.0 | 17.0 | 36.4 | 42.5 | 43.1 | 12.9 | 8.5 | 12.9 |
|  | Rmax/Rmin | 1.2 | 1.2 | 1.2 | 1.4 | 4.0 | 2.7 | 2.8 | 1.7 | 1.5 | 1.5 | 4.5 | 5.0 | 6.2 |
| Chroma (a*, b*) |  | 0.94 | 1.33 | 0.76 | 0.87 | 1.94 | 1.45 | 1.46 | 1.07 | 0.80 | 0.84 | 4.18 | 4.4 | 4.9 |
| CIE chromaticity coordinates | x | 0.311 | 0.310 | 0.312 | 0.312 | 0.308 | 0.310 | 0.310 | 0.311 | 0.312 | 0.311 | 0.304 | 0.322 | 0.302 |
|  | y | 0.329 | 0.328 | 0.330 | 0.330 | 0.327 | 0.329 | 0.329 | 0.330 | 0.329 | 0.329 | 0.323 | 0.336 | 0.323 |

TABLE 2-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| CS [MPa] | impossible to measure | impossible to measure | impossible to measure | 485 | 841 | 836 | 828 | 748 | 730 | 722 | 437 | 437 | 485 |
| DOL [μm] | impossible to measure | impossible to measure | impossible to measure | 6 | 25 | 25 | 24 | 29 | 31 | 32 | 7 | 7 | 6 |
| Phase-separated structure | binodal | binodal | binodal | binodal | binodal | binodal | binodal | binodal | binodal | binodal | binodal | binodal | binodal |
| Average particle size [μm] | 1.0 | 1.2 | 1.0 | 0.25 | 0.37 | 0.5 | 0.41 | 0.51 | 0.76 | 0.85 | 0.10 | 0.06 | 0.16 |
| Volume density of particles [%] | 20 | 20 | 20 | 20 | 20 | 20 | 20 | 20 | 20 | 20 | 20 | 20 | 20 |

Thus, it was seen from the graph shown in FIG. 1 that the chroma C (a*, b*) can be controlled to more than 3.2 by controlling the value obtained by dividing the maximum value of the total light reflectance (Rmax) by the minimum value of the total light reflectance (Rmin) in the wavelength range of 380 nm to 780 nm to more than 4.2, and this made it possible for phase-separated glass for chemical strengthening to have an appearance colored bluish white.

FIG. 3 shows the result of plotting the x-value and the y-value of CIE chromaticity coordinates as the abscissa and as the ordinate, respectively. In FIG. 3, the area enclosed in the quadrilateral is the range corresponding to the chroma C (a*, b*) of more than 3.2. From the result shown in FIG. 3, it was found that when the measurement result is positioned in the area enclosed in the quadrilateral specified by A(0.311, 0.319), B(0.299, 0.308), C(0.285, 0.314) and D(0.297, 0.326) in the CIE chromaticity coordinates, the chroma C (a*, b*) can be adjusted to more than 3.2, and the phase-separated glass for chemical strengthening which takes on bluish white and has excellent designability could be obtained.

Further, Table 2 shows that the wavelength dependence of the total light reflectance can be lessened and the chroma C (a*, b*) can be controlled to more than 3.2 by adjusting a dispersed phase to have an average particle size of less than 0.2 μm, and indicates that such an adjustment makes it possible to obtain a phase-separated glass for chemical strengthening which takes on a bluish white color.

While the present invention has been described in detail and with reference to specific embodiments thereof, it will be apparent to one skilled in the art that various changes and modifications can be made therein without departing from the spirit and scope of the present invention. This application is based on Japanese Patent Application No. 2012-268594 filed on Dec. 7, 2012, the entire contents of which are incorporated herein by reference.

The invention claimed is:

1. A phase-separated glass for chemical strengthening, having a total light reflectance of 10% or more in a wavelength range of 380 nm to 780 nm and a value obtained by dividing a maximum value of the total light reflectance by a minimum value of the total light reflectance of more than 4.2, when measured in a form of a plate having a thickness of 1 mm.

2. The phase-separated glass for chemical strengthening according to claim 1, wherein when reflected light from a D65 light source is measured with respect to the phase-separated glass for chemical strengthening which has been formed into a plate having a thickness of 1 mm and placed on a white standard board having L* value of 98.44, a* value of −0.20 and b* value of 0.23 [EVER-WHITE (Code No. 9582), a product of Evers Corporation], a measured value thereof is positioned within an area enclosed in a quadrilateral specified by A(0.311, 0.319), B(0.299, 0.308), C(0.285, 0.314) and D(0.297, 0.326) in CIE chromaticity coordinates.

3. The phase-separated glass for chemical strengthening according to claim 1, wherein a dispersed phase thereof has an average particle size of 0.08 μm or more and less than 0.2 μm.

4. The phase-separated glass for chemical strengthening according to claim 1, comprising, in terms of mole percentage, from 50% to 80% of $SiO_2$, from 0 to 7% of $B_2O_3$, from 0 to 10% of $Al_2O_3$, from 0 to 30% of MgO, from 5% to 15% of $Na_2O$, from 0 to 5% of CaO, from 0 to 15% of BaO and from 0 to 10% of $P_2O_5$, wherein a total content of MgO, CaO and BaO is from 10% to 30%.

5. A chemically-strengthened phase-separated glass, which has been obtained by chemically strengthening the phase-separated glass for chemical strengthening according to claim 1.

6. A housing, wherein a part or whole of the housing is the chemically-strengthened glass according to claim 5.

7. The housing according to claim 6, which is a housing of an electronic device.

8. A phase-separated glass, comprising, in terms of mole percentage, from 50% to 80% of $SiO_2$, from 0 to 7% of $B_2O_3$, from 0 to 10% of $Al_2O_3$, from 0 to 30% of MgO, from 5% to 15% of $Na_2O$, from 0 to 5% of CaO, from 0 to 15% of BaO and from 0 to 10% of $P_2O_5$, wherein a total content of MgO, CaO and BaO is from 10% to 30%, and having a total light reflectance of 10% or more in a wavelength range of 380 nm to 780 nm and a value obtained by dividing a maximum value of the total light reflectance by a minimum value of the total light reflectance of more than 4.2.

9. A phase-separated glass, having a total light reflectance of 10% or more in a wavelength range of 380 nm to 780 nm and a value obtained by dividing a maximum value of the total light reflectance by a minimum value of the total light reflectance of more than 4.2, when measured in a form of a plate having a thickness of 1 mm.

10. The phase-separated glass according to claim 9, wherein when reflected light from a D65 light source is measured with respect to the phase-separated glass which has been formed into a plate having a thickness of 1 mm and placed on a white standard board having L* value of 98.44, a* value of −0.20 and b* value of 0.23 [EVER-WHITE (Code No. 9582), a product of Evers Corporation], a measured value thereof is positioned within an area enclosed in a quadrilateral specified by A(0.311, 0.319), B(0.299, 0.308), C(0.285, 0.314) and D(0.297, 0.326) in CIE chromaticity coordinates.

11. The phase-separated glass according to claim 9, wherein a dispersed phase thereof has an average particle size of 0.08 μm or more and less than 0.2 μm.

12. The phase-separated glass according to claim 9, comprising, in terms of mole percentage, from 50% to 80% of $SiO_2$, from 0 to 7% of $B_2O_3$, from 0 to 10% of $Al_2O_3$, from 0 to 30% of MgO, from 5% to 15% of $Na_2O$, from 0 to 5% of CaO, from 0 to 15% of BaO and from 0 to 10% of $P_2O_5$, wherein a total content of MgO, CaO and BaO is from 10% to 30%.

13. The phase-separated glass according to claim 12, wherein a total content of $ZrO_2$, $P_2O_5$ and $La_2O_3$ is from 0.5% to 10%.

14. The phase-separated glass according to claim 9, which is for use in a building material.

15. The phase-separated glass according to claim 14, which is for an interior use of a gallery or tunnel.

\* \* \* \* \*